United States Patent [19]

Stanzani

[11] 4,310,836

[45] Jan. 12, 1982

[54] PHOTOELECTRIC BARRIER, PARTICULARLY USEFUL AS AN ACCIDENT-PREVENTING DEVICE IN MACHINE TOOLS

[75] Inventor: Giuseppe Stanzani, Bologna, Italy

[73] Assignee: Datalogic S.p.A., Lippo di Caldera di Reno, Italy

[21] Appl. No.: 66,597

[22] Filed: Aug. 14, 1979

[30] Foreign Application Priority Data

Aug. 25, 1978 [IT] Italy .................... 3518 A/78

[51] Int. Cl.³ .............................................. G08B 21/00
[52] U.S. Cl. .................................... 340/556; 250/221;
340/512; 340/515; 340/516; 340/679; 361/176
[58] Field of Search ............... 340/679, 680, 681, 556,
340/540, 507, 512, 515, 516; 250/221; 361/175,
176

[56] References Cited

U.S. PATENT DOCUMENTS

| 3,119,103 | 1/1964 | Fertig ................................ 340/512 |
| 3,509,359 | 4/1970 | Embling ............................ 340/507 |
| 3,543,260 | 11/1970 | Engh ................................ 340/521 |
| 3,928,849 | 12/1975 | Schwarz ............................ 340/515 |
| 3,970,846 | 7/1976 | Schofield, Jr. et al. .......... 250/221 |
| 4,127,771 | 11/1978 | Sick .................................. 250/221 |

Primary Examiner—Glen A. Swann, III
Attorney, Agent, or Firm—Guido Modiano; Albert Josif

[57] ABSTRACT

A photoelectric barrier comprises an emitter emitting a movable modulated beam which scans periodically at a high rate an area to be protected. The beam is then redirected to a photoelectric receiver supplying the signal deactivating the machine controls. The barrier also comprises a circuit generating pulses which are effective to suppress some of the pulses emitted by the photoelectric emitter in order to monitor the machine operation during scanning, the suppression pulses being produced by detecting the correct rotation of the scanning motor.

4 Claims, 3 Drawing Figures

PHOTOELECTRIC BARRIER, PARTICULARLY USEFUL AS AN ACCIDENT-PREVENTING DEVICE IN MACHINE TOOLS

BACKGROUND OF THE INVENTION

This invention relates to a photoelectric barrier, particularly useful as an accident-preventing device in machine tools.

Known are light barriers acting as safety devices in presses, wherein a light beam is moved periodically and in rapid succession through an area to be protected. Through suitable optical means, the light beam is redirected to a photoelectric transducer. If an obstacle enters the protected area, the output signal from the photoelectric transducer varies such that the press is stopped through a suitable electronic processor.

A known type of photoelectric barrier comprises a polygonal rotating mirror whereon a light beam is caused to impinge. The polygonal mirror is located at the focus of a concave mirror, such that the light beam, which is periodically diverted by the rotation of the polygonal mirror, is moved parallel to itself and scans periodically the area to be protected, which is included between said concave mirror, on one side, and a reflector reflecting the light beam to itself in every position, on the other side. Between the light source and the polygonal mirror, there is provided an inclined semi-transparent mirror which diverts the reflected light beam to an electric receiver.

With that device, the area to be protected is scanned periodically at a high rate. When the area is clear, the light beam can travel back and forth undisturbed, and the receiver is at a state of substantial equilibrium. However, as an obstacle, e.g. the hand of an operator, enters the field of the protected area, a series of dark pulses appear on the receiver. Such pulses, through suitable electronics, cause a relay to open which stops the press.

It is a safety requisite that the press cannot be activated, or is shut off, while the photoelectric device is rendered inoperative by a failure whatever. For this reason, in conventional photoelectric barriers there is provided a monitoring device, effective to monitor the photoelectric barrier and its correct operation upon completion of each press stroke. To this end, during the safe stroke of the press pusher movement, i.e. during the upstroke thereof, the photoelectric barrier is subjected to full checking. Only if the checks are satisfactory will the press be permitted to effect the subsequent stroke.

However, this monitoring approach fails to eliminate the chance that after the checking has been carried out, i.e. during the downstroke of the press pusher, part of the safety arrangement is ineffective. If at this moment, one enters the protected area an accident may occur in spite of the monitored operation provided.

Also known is a photoelectric barrier (German Pat. No. 1221927), wherein the hazard just described is avoided in that the operation of the safety device is not checked after each stroke of the press, but rather after each scan of the protected area by the light beam. This is accomplished through a mirror-carrying polygonal rotor, wherein the mirrors are arranged alternately with blank regions, thereby after each protection scan (mirror region) there occurs a self-checking interval (blank region). The dark pulses can only appear by contrast to a preceding bright pulse, and if the height of the protected area is covered by an obstacle such that the photoelectric receiver receives no light, the pulses disappear. However, that known device also obviates this problem.

According to the German Pat. No. 1221927, the protection period is separated from the checking period by a short bright pulse. Such bright pulses are generated by means of small mirrors located on the mirror-carrying rotor, and reflect the light directly onto the photoelectric transducer. Thus, the bright pulses will still appear even when the protected surface is completely obscured. During the hazardous downward stroke of the press cycle, a protection phase occurs which is followed by a checking phase, characterized by the bright pulses which are self-generated by the mirrors, and so forth in synchronization. The self-checking principle disclosed in the cited German Pat. No. 1221927 shows no signal of a dynamic type up to the final relays, thereby a complementary failure of the final relay stages cannot be detected. That known device, moreover, employs a glow bulb type of light source, and the photoelectric receiver cannot, therefore, be shielded from light sources such as the sunlight and lamps.

SUMMARY OF THE INVENTION

This invention sets out to provide a photoelectric barrier which ensures self-control, or self-checking capabilities, of the device during the active cycle of the machine wherewith it is associated.

According to one aspect of the present invention, there is provided a photoelectric barrier particularly useful as an accident-preventing device in machine tools comprising an emitter of a movable modulated beam constituted by a constant train of pulses, means for causing said beam to scan periodically at high rate an area to be protected, a photoelectric receiver receiving said pulses and effective to supply, in the presence of an obstacle in the area to be protected, a signal deactivating the machine tool, a circuit generating pulses having a predetermined frequency said pulse generating circuit being connected with said emitter so as to cause suppression of one or more of the pulses of the beam to effect the monitoring of the operation of the barrier during the scanning period.

BRIEF DESCRIPTION OF THE DRAWINGS

One embodiment of the invention will be next described as illustrated in the accompanying drawings, where.

DESCRIPTION OF THE PREFERRED EMBODIMENTS

Figure 1:
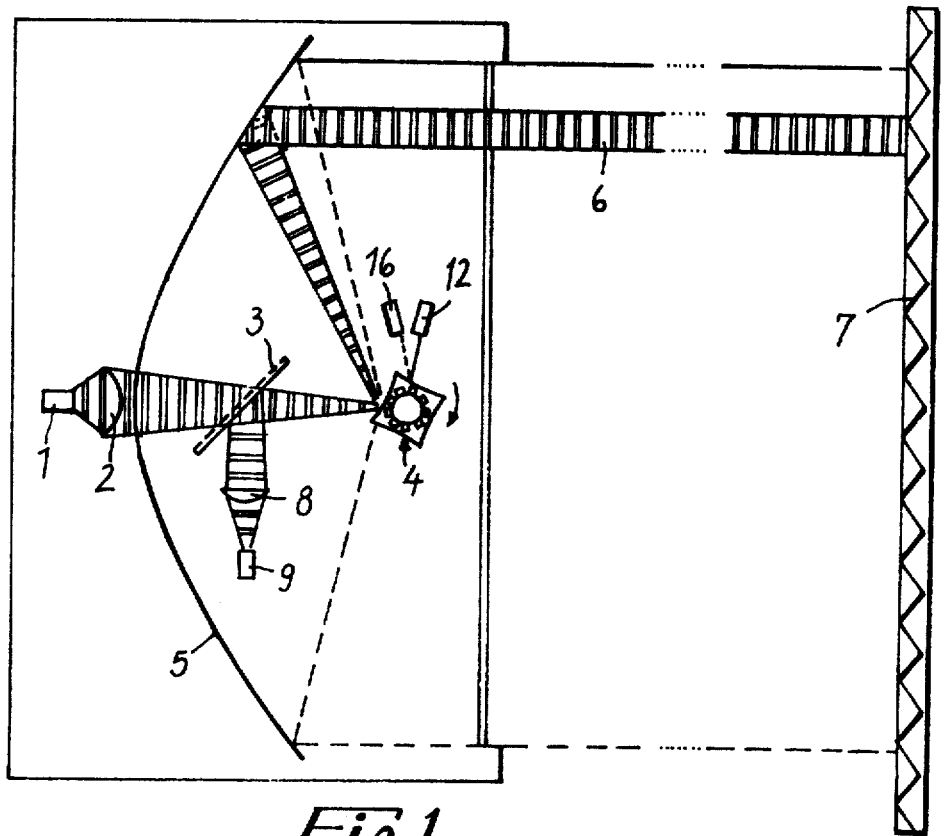
FIG. 1 shows the optical and mechanical components of a photoelectric barrier according to this invention.
Figure 2:
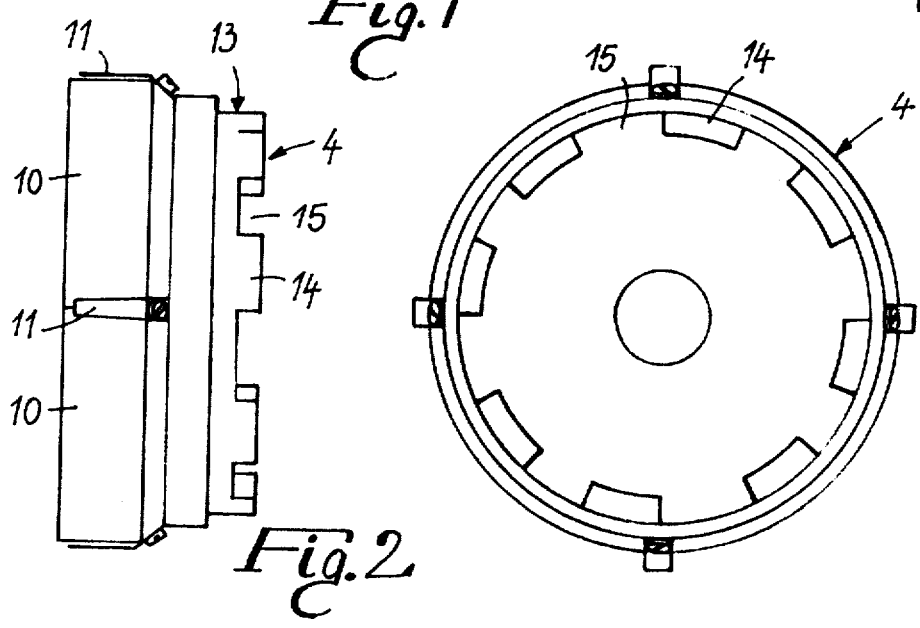
FIG. 2 shows a mirror-carrying rotor with its additional track, in side and front elevation.
Figure 3:
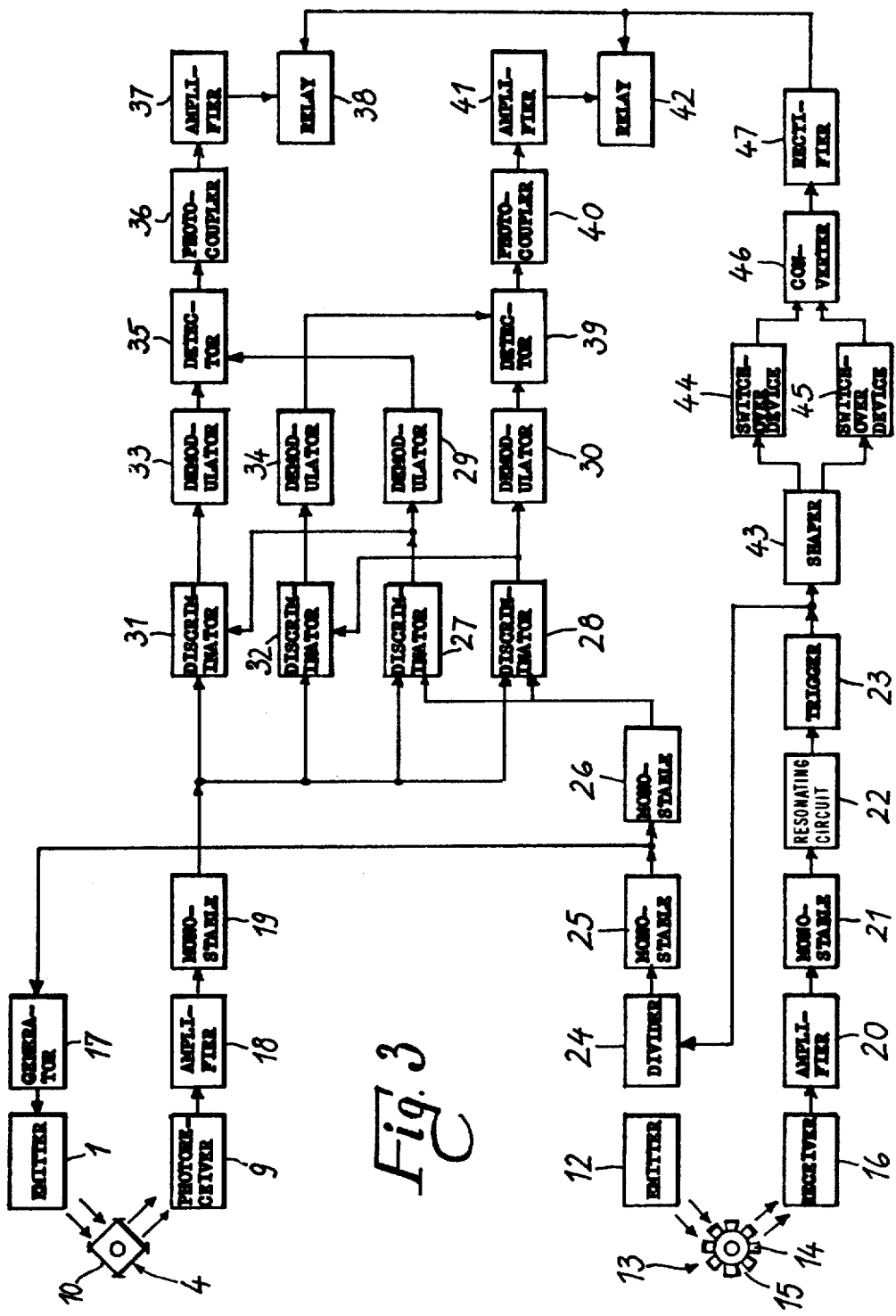
FIG. 3 is a block diagram of the electronic system.

The reference numeral 1 indicates a gallium arsenide photoelectric which, upon excitation by pulses at a frequency of 20 KHz, emits a modulated infrared beam.

The modulated beam from the emitter 1 is focused by the optical system 2, and after having passed through the semitransparent mirror 3 impinges on a polygonal mirror-carrying rotor 4. This rotor is located at the focus point of a parabolic mirror 5. The mirror-carrying rotor 4 sends the beam back to the mirror 5, and by rotation, produces scanning of the area to be protected. All of the rays 6 reflected by the mirror 5 are parallel to one another. On the other end or side of the area to be protected, there is provided a reflector 7 comprising a reflective surface. The reflector 7 reflects the received ray 6 back along its original direction regardless of the angle of incidence thereof to the parabolic mirror 5 which sends it to the mirror-carrying rotor 4 which, in turn, reflects it to the semitransparent mirror 3. The semitransparent mirror 3 diverts the ray to the focusing system 8, whence it finally impinges on the photoreceiver 9.

In the embodiment shown, the mirror-carrying rotor 4 comprises four scanning mirrors 10 which cover 90° of the rotor rotation each. As a mirror 10 is rotated, the ray 6 scans the area to be protected and actuates the photoreceiver 9, if no obstacle is met in the scanned area. The same applies to the other three mirrors 10.

At the joint between adjacent mirrors 10, there is provided a small auxiliary mirror 11 which reflects the ray towards the photoreceiver 9, in order to prevent the joints between the mirrors 10 from being read as an obstacle by the photoreceiver 9.

A second emitter 12 sends a beam along an additional track or path 13 of the rotor 4. The track 13 is formed by sequentially arranged lugs 14 and notches 15 forming a rack-like geometry.

A receiver 16, suitably arranged relative to the emitter 12, receives by reflection a ray from the emitter only when the ray is reflected by the lugs 14. Then, the receiver 16 issues a signal. This same action can be accomplished through other systems, such as magnetic or inductive ones.

The emitter 1 is excited by a generator circuit 17 supplying a pulsating current at a frequency of 20 KHz, which excites the infrared emitter 1 for a period of 0.5 microseconds. When the protected area is clear, the photoreceiver 9 receives the infrared pulses, which are thereby converted into electric pulses. The latter are then amplified and digitalized (that is made of constant amplitude and duration) in a wide band amplifier 18 prior to being demodulated by a resettable monostable circuit 19, the period whereof is a function of the emission frequency. The output from the monostable 19 is at a "0" logical level when all the pulses from the emitter 1 received on the receiver 9 appear at the output of the amplifier 18. Otherwise, the output from the monostable 19 will be at a logical level of "1" for the duration of the absence of pulses from the emitter 1.

The signal supplied by the receiver 16 is amplified in the amplifier 20, and then shaped by the monostable circuit 21 which supplies a square waveform signal the frequency whereof is related to the mirrorcarrying rotor rpm, which are assumed to be constant. The signal from the monostable 21 is applied to resonating circuit 22 tuned to the frequency of the signals from the monostable 21 produced at the proper rpm of the rotor 4. In other words a correct signal is present at the output of the resonating circuit 22 only when the input signal has a frequency for which the circuit has been tuned. If the rotor speed differs from the correct one, then at the output of the resonating circuit a sinusoidal signal will be present having a smaller amplitude. A trigger circuit 23 monitors the amplitude of the sinusoidal signal at the output of the circuit 22 and, in turn, supplies a square waveform signal when the amplitude of the sinusoid is correct.

Thus, it is possible to detect whether the correct frequency is produced, and accordingly whether the rotor speed is correct. The frequency of the signal supplied by the trigger 23 is then divided by four by a divider circuit 24. The signal is then shaped by the monostable circuit 25 which, on each negative-going passage of the output signal from the divider 24, emits a fixed duration pulse having an amplitude such that, when supplied to the generator 17, it permits the suppression of one of the pulses from the generator 17 and emitter 1. This is in practice equivalent to creating an artificial obstacle during which the self-control, or self-checking procedure, of the photoelectric barrier is carried out. The pulse from the monostable 25 is also applied to a monostable circuit 26 which supplies, in turn, a pulse with twice the duration of its input signal at each negative-going passage of the latter. The output signal from the circuit 26 is then led to one input of a pair of discriminating circuits 27 and 28; to the other input of such circuits is applied the signal from the resettable monostable 19. Such discriminating circuits 27, 28 may be NAND gates whose output signals depend on the combination of the input signals. It is assumed that a pulse signal only appears at the output of each discriminator, 27 and 28, if the self-control has been carried out and the upstream circuits are operating correctly. In such conditions, at each self-control operation, the outputs from the discriminators 27 and 28 acquire a logical level of "0" throughout the duration of the self-control operation. The demodulating circuits 29 and 30 (also comprising resettable monostable circuits), respectively connected to the outputs of the discriminators 27 and 28, supply a signal having a logical level of "1" each, when and only when the level of the output signals from the circuits 27 and 28 is correct, that is when the self-control circuits are in order. These same signals are applied respectively to one input of each discriminator 31 and 32, which serve to deactuate the system during the self-control period. The other input of each discriminator, 31 and 32, receives the signal supplied by the monostable 19. The output signals from the discriminators 31, 32 are led to respective demodulating circuits 33 and 34 comprising resettable monostable circuits. When all of the pulses from the emitter have been received by the receiver 9, by amplifier 18 and by monostable 19, the discriminators 31 and 32 issue a signal to the logical level of "1". The demodulating circuits 33 and 34 supply, in turn, a signal of logical level "1". If none of the pulses from the emitter 1 are received by 9, 18,19, e.g. on account of the presence of an obstacle in the protected area, the discriminators 31 and 32 supply a pulse signal which, as detected by the demodulators 33 and 34, enables the latter to supply, in turn, a "0" level to indicate the presence of an obstacle in the protected area. Thereafter, the output signals from the demodulators 29 and 33 are passed to to the inputs of a coincidence detecting circuit or NAND gate 35, which supply a "0" logical level signal only if all of the signals appearing at these inputs are at a logical level of "1". From the coincidence circuit 35, the signal is passed, through a photocoupler 36, and an amplifier 37, to an output relay 38 which is energized whenever certain conditions occur, namely: absence of an obstacle in the protected area, self-control operation completed, correct rotation of the mirror-carrying rotor, and presence of the relay supply voltage. Furthermore, the output signals from the modulators 30 and 34 are directed to the inputs of the coincidence detecting circuit or NAND gate 39 which supplies a signal with a logical level of "0" only when all of the signals that appear at the inputs have a logical level of "1". Then through a photocoupler 40 and amplifier 41, an output relay 42 is energized, i.e. when an obstacle is present or when the self-control is not effected or does not respond normally.

The signal from the trigger circuit 23 is converted into a symmetrical square wave signal through a shaping circuit 43, and through electronic switch-over devices 44,45, drives a voltage converter 46 which, after the rectification carried out by the rectifier 47, supplies the supply voltage required for the relay system. This supply voltage can only be provided if the rotational speed of the mirror-carrying rotor 4 is correct, and if all of the circuits 12,16,20–23 and 43–47 are operating correctly.

The photoelectric barrier just described operates as follows.

The emitter 1, being excited by the pulse generator 17 at a frequency of 20 KHz, emits a train of pulses which, when picked up by the photoreceiver 9 and then amplified in the amplifier 18, are passed to monostable 19, which issues as its output a signal with a logical level of "0". Simultaneously therewith, the photoreceiver 16, by means of the additional track or path 13, is reached by a train of pulses the frequency whereof is determined by the rpm of the rotor 4. Assuming that the rotor is turning at the correct rotational speed, said train of pulses, as processed by the circuits 21–23, is available as a square waveform signal at the output of the trigger 23 and is enabled to drive, through the shaping circuit 43 and switch-over devices 44,45, the converter 46 which supplies the A.C. voltage which, after being rectified by the rectifier 47, powers the output relays 38 and 42.

The pulsive output signal from the trigger 23 is subjected, in the circuit 24, to a frequency division, which allows the pulses to be spaced out such that the latter, after being shaped by the circuit 25 and passed to the generator 17, can suppress at regular intervals one pulse from the train of pulses emitted by the generator 17. Thus, dark pulses are obtained which are reiterated at the same frequency as the suppression pulses and are entirely similar to the ones determined by the appearance of an obstacle in the protected area. During such dark pulses, the self-control is carried out on the photoelectric barrier, i.e. the correct operation of the circuits is checked.

If everything operates correctly, the discriminators 27,28 and 31,32 receives signals effective to produce at the outputs of the demodulators 29,30 and 33,34 signals with the same sign which, when applied to the coincidence circuits 39 and 35, cause a signal with "0" level to appear at the outputs thereof. In particular, it should be noted that during the self-control phase or operation, i.e. the phase of a suppressed pulse, the input signals to the disciminators 31,32 change simultaneously, thereby their output signal remains unaltered.

By contrast, when the output signal from the circuit 19 constantly remains at a level of "1" owing to the presence of an obstacle, the input signals to the discriminators 31, 32 vary, thereby the coincidence circuits 35,39 are applied different signals which cause the relays to be switched over.

It should be noted that the switching over of the relays also occurs when, for a reason whatever, a failure occurs in the circuit which generates the suppressing pulses.

The particular supply circuit for the relays affords a complementary degree of safety; in fact, the converter only operates in the dynamic mode and all the static situations, as arising from anomalies in the converter or in the circuits upstream thereof, cause the disappearance of the relay drive voltage and consequently the stopping of the machine tool.

The barrier described in the foregoing has the added advantage of affording an effective starting interlock at the time current is applied, until the mirror-carrying rotor reaches its rotational speed setting. This in order to avoid that the machine is started inadvertently while equipped with the barrier.

In practicing the invention, the barrier will include grouped-together logic gates, with AND/OR functions, aimed at providing two independent output channels for controlling the two output relays 38,42 integral with a relay system so designed that, at each cycle of the protected machine, all of the relays must change their state and be at a determined state for releasing the following cycle. This switch-over command is obtained through the opening of a contact controlled by the machine tool during the safe phase ot its movement.

I claim:

1. A photoelectric barrier, particularly useful as an accident-preventing device in machine tools comprising an emitter of a movable modulated beam constituted by a constant train of pulses, means for causing said beam to scan periodically at high rate an area to be protected, a photoelectric receiver receiving said pulses and effective to supply, in the presence of an obstacle in the area to be protected, a signal deactivating the machine tool, and a circuit generating pulses having a predetermined frequency, said pulse generating circuit being connected with said emitter so as to cause suppression of one or more of the pulses of the beam to effect the monitoring of the operation of the barrier during the scanning periods.

2. A photoelectric barrier as claimed in claim 1 in which said emitter of the modulated beam comprises a gallium arsenide infrared beam emitter controlled through a pulse generator.

3. A photoelectric barrier as claimed in claim 1 in which said means comprises a polygonal mirror-carrying rotor and said circuit comprises an emitter sending a beam and a photoelectric receiver cooperating with said emitter through a rack-like track of said rotor, said rack-like track comprising lugs spaced by notches for sequentially reflecting the beam on to the receiver.

4. A photoelectric barrier as claimed in claim 3 further comprising relays controlling the machine tool and powered by a voltage converter, means detecting the rotational speed of the rotor and driving said converter when said rotor is turning at the correct rotational speed.

* * * * *